United States Patent [19]
Gremm

[11] Patent Number: 4,591,489
[45] Date of Patent: May 27, 1986

[54] PROCESS FOR THE TREATMENT OF HYDROCHLORIC ACID PICKLES CONTAINING IRON AND ZINC

[75] Inventor: Walter Gremm, Mettmann, Fed. Rep. of Germany

[73] Assignee: Hamm Chemie GmbH, Duisburg, Fed. Rep. of Germany

[21] Appl. No.: 663,031

[22] Filed: Oct. 19, 1984

[30] Foreign Application Priority Data

Oct. 21, 1983 [DE] Fed. Rep. of Germany ....... 3338258

[51] Int. Cl.$^4$ ................................................ C01G 9/04
[52] U.S. Cl. ..................................... 423/100; 423/101; 423/103; 423/139; 423/140; 423/491; 423/DIG. 1; 75/101 BE; 75/109; 75/111; 75/120
[58] Field of Search .................... 75/101 BE, 109, 111, 75/113, 120; 423/100, 101, 103, 139, 140, 147, 491, DIG. 1

[56] References Cited

U.S. PATENT DOCUMENTS

| | | | |
|---|---|---|---|
| 4,097,271 | 6/1978 | Swinkels et al. | 75/104 |
| 4,124,462 | 11/1978 | Reinhardt et al. | 423/101 |
| 4,288,304 | 9/1981 | DeMarthe et al. | 75/109 |
| 4,317,804 | 3/1982 | Ichijo | 423/139 |
| 4,421,616 | 12/1983 | Bjune et al. | 423/100 |
| 4,465,569 | 8/1984 | Bjune et al. | 423/100 |

FOREIGN PATENT DOCUMENTS 2328151 8/1975 Fed. Rep. of Germany.
2307880 11/1976 France.

Primary Examiner—John Doll
Assistant Examiner—Robert L. Stoll
Attorney, Agent, or Firm—Curtis, Morris & Safford

[57] ABSTRACT

A process for the treatment of a spent hydrochloric acid solution containing dissolved iron, zinc, and minor amounts of heavy metals to remove such dissolved metals from the solution, which process comprises contacting said solution with metallic iron in a first stage, whereby trivalent iron present in the solution is reduced to divalent iron and certain of said heavy metals may be reduced to elemental form, next, in a second stage, contacting said solution with metallic zinc, whereby any remaining heavy metals are reduced to elemental form, and then extracting zinc, as zinc chloride, from the resulting aqueous phase with an organic liquid containing a complexing agent for zinc chloride.

5 Claims, 1 Drawing Figure

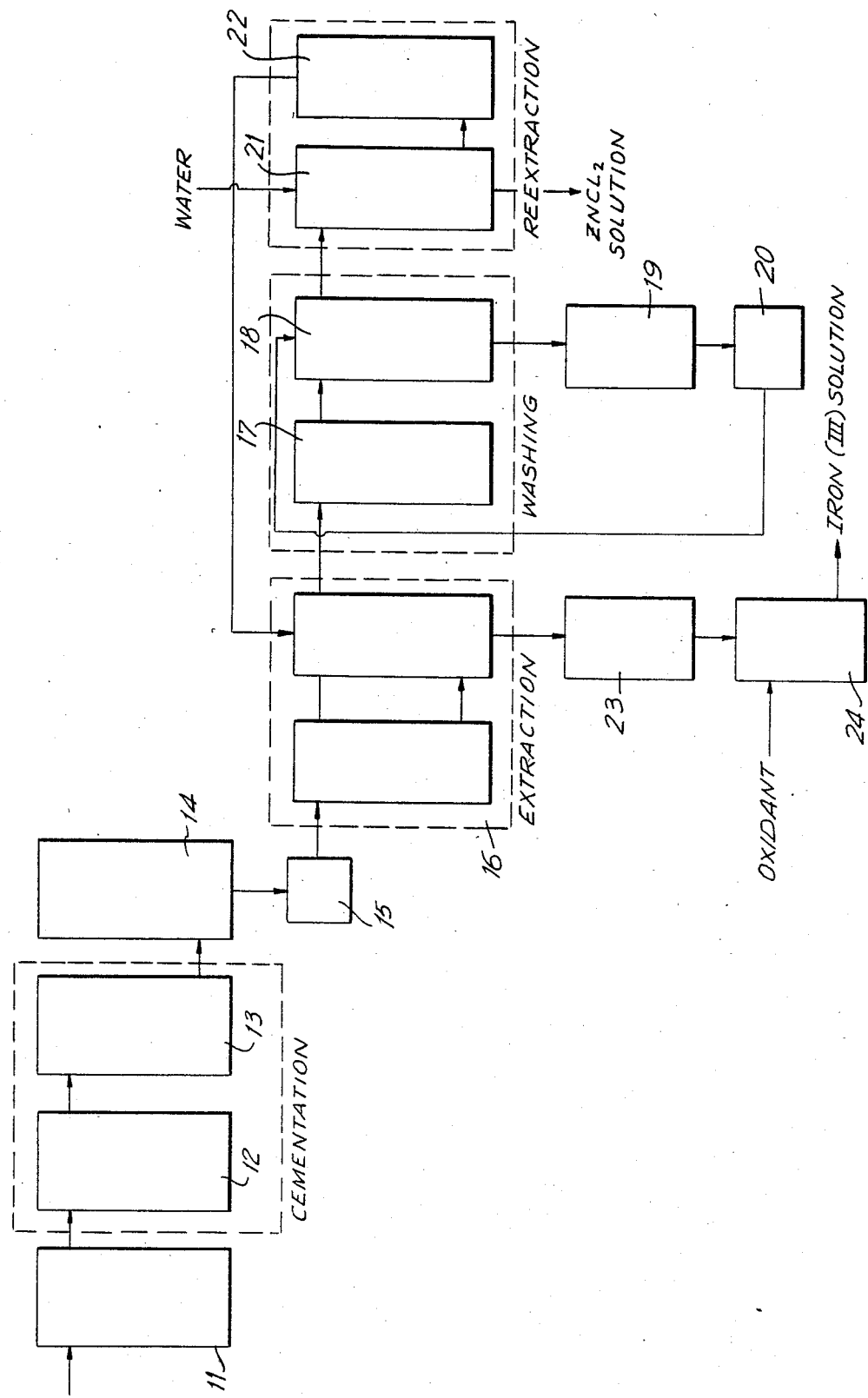

PROCESS FOR THE TREATMENT OF HYDROCHLORIC ACID PICKLES CONTAINING IRON AND ZINC

The present invention relates to a process for treating spent hydrochloric acid solution containing iron and zinc by liquid-liquid extraction to recover said iron and zinc.

Structural iron and steel parts are protected against corrosion by being coated with thin films of electronegative metals, mainly zinc.

To achieve good adhesion between the substrate metal and the coating metal, the substrate is carefully cleaned in alkaline and/or acidic solutions before the coating metal is deposited by one of various methods. The usual practice is to use hydrochloric acid, for example in concentrations ranging from 5 to 25 percent. During pickling, the hydrochloric acid is exhausted as the substrate metal (iron) and also the coating metal, for example, zinc, go into solution. The activity of the pickle is maintained by the continuous addition of concentrated replenishment acid until a limiting concentration of the metals going into solution is reached. When this saturation concentration is reached, the spent pickle is discarded and thus becomes a disposal and ecological problem.

A number of processes for the treatment of such waste acids have been described. For example, from French Pat. No. 2,307,880 it is known in the treatment of such waste acids to extract the aqueous phase with organophosphorus-containing organic phases for the separation of iron chloride and zinc chloride and to reextract the zinc chloride from the organic phase. For the improved separation of iron and zinc, a preceding reduction by means of metallic iron is proposed for converting the trivalent iron completely to the divalent form before the extraction.

More in particular, the organophosphorus extractants suitably are of the formula

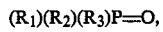

$(R_1)(R_2)(R_3)P=O$, where $R_1$, $R_2$, $R_3$ are each independently alkyl or alkoxy (including linear, branched, and cyclic alkyl and alkoxy) suitably having up to 12 carbon atoms and preferably 2 to 8 carbon atoms. A preferred extractant is tributyl phosphate ($R_1=R_2=R_3=$butyloxy). U.S. Pat. Nos. 4,097,271 and 4,317,804 also disclose extractant systems of this kind.

The prior are processes are either too expensive and uneconomical or are unsatisfactory in terms of the purity of the raffinate solutions obtained, and hence of their potential uses.

Regardless of the end products sought to be obtained, a primary requirement for a promising process is that the iron and zinc contained in the solution be separated from each other as completely as possible in order that products may be obtained which can be either put on the market or otherwise reused. For marketing, the process must yield products of high purity. For reuse, it is generally proposed to use the pyrohydrolytic route. However, since that route is energy intensive and necessitates the adoption of elaborate and costly corrosion prevention measures in pyrolysis equipment suited for the purpose, this approach seems outmoded.

Since, on the one hand, the recovery process should yield readily marketable products of customary purity and, on the other hand, the starting material consists in the main of spent pickles from hot dip galvanizing plants, the prior art processes have failed to prove satisfactory for this purpose.

In addition to iron and zinc, the spent acids from galvanizing plants contain a number of other heavy metals as minor and trace elements. These are undesirable and must be removed if good use is to be made of the end products and if the latter are to have the customary purity.

The object of the present invention, thus, is to provide a two step process for the treatment of spent hydrochloric acid solutions containing iron and zinc by liquid-liquid extraction, wherein for the separation of iron and zinc the iron present in the pickles in trivalent form is converted completely to divalent iron by reduction, the zinc is extracted with organic solvents containing complexing agents, and the phases containing iron and zinc are treated conventionally after reextraction. Such a process permits improved treatment of the hydrochloric acid pickles and improved separation of iron and zinc as well as the reuse of these metals or their compounds.

This object is accomplished by the present invention by effecting reduction of the trivalent iron to the +2 oxidation state and of other metallic ions to the elemental state in two stages through successive additions of metallic iron and zinc.

In addition to iron and zinc, the other heavy metals present in these metals as alloying, minor, and trace elements, primarily Mn, Pb, Sn, Cu, Cd, As, Sb, and Bi, are usually dissolved in corresponding proportions in the spent acid. They are unwanted and troublesome contaminants so far as the practical use or further processing of the raffinate solutions obtained is concerned. In keeping with their tendency to form chlorine complexes, they are distributed during the extraction either completely or partially to either raffinate solution. For this reason, it is desirable to remove these metals from the solution to the extent possible prior to the liquid-liquid extraction. This is advantageously accomplished by a preferred two stage cementation process in accordance with the invention, wherein the addition of iron and zinc is carried out so that, in a first stage, a pH value of about 3 is established by the controlled addition of metallic iron and, in a second stage, metallic zinc is added in an amount sufficient for the precipitation of any heavy metals still present in the solution.

The treatment with metallic iron in the first stage serves several purposes at the same time. For one thing, residual free hydrogen chloride is reduced to a pH value of about 3. This is the working pH in the zinc cementation which follows. The trivalent iron in the solution is simultaneously converted to the +2 state. This process is of importance to the selectivity of the liquid-liquid extraction which follows, since $Fe^{+2}$, in contrast to $Fe^{+3}$, does not form chlorine complexes which are taken up by the extractant as is zinc.

Moreover, the addition of iron gives rise to the first stage of cementation for the elements copper, arsenic, antimony, and bismuth, which are more positive in the electrochemical series, and for a portion of the lead.

The remaining heavy metals, tin and cadmium, as well as the major portion of the lead, are precipitated as a metal sludge in the second cementation stage by treatment with zinc dust.

The accompanying drawing is a flow sheet illustrating a preferred embodiment of the present invention.

In this advantageous embodiment of the process of the invention, the cementation is carried out by conducting the spent acid in the first stage through a column filled with iron turnings and then, in the second cementation stage, adding zinc dust to the spent acid in a reaction vessel so that the metals which remain in the solution after the first stage are precipitated as a sludge which collects at the bottom of the reaction vessel and can be discharged conventionally.

The desired reaction of the spent acid with the iron turnings proceeds satisfactorily even at room temperature. However, with increased acid throughput it may prove advantageous to increase the temperature by not more than 30° C. In the zinc dust treatment which follows, this slightly increased operating temperature will enchance the efficiency of the cementation somewhat.

Air is advantageously completely excluded from all equipment components of the plant from the zinc cementation stage to the washing stage after the extraction by maintaining an inert gas atmosphere with a view to preventing reoxidation of divalent iron to the +3 state. If this is not done, the cemented cadmium in particular may redissolve and the selectivity of the iron-zinc separation in the extraction section of the plant may at the same time be reduced.

The degree of separation of iron and zinc achieved by the extraction of the zinc from the aqueous phase is influenced by the degree to which the aqueous phase is taken up by the organic phase. This emulsion formation and the attendant transfer of iron must be counteracted to the extent possible by an appropriate composition of the extractant and of the aqueous solution.

While extractants containing organophosphorus, such as tributyl phosphate, can be used, good results are also obtained when long chain aliphatic amines are employed. While amines of any degree of alkylation can be employed as extractants, their efficacy increases with the degree of alkylation so that tertiary or quaternary amines are preferred. Also, amines in which the alkyl groups have more than four carbon atoms in the chain are preferred, particularly octyl (both normal and iso-octyl). On a technical scale, $C_6$–$C_{12}$ amine mixtures are usually used, particularly $C_8$–$C_{10}$ amines having a predominant $C_8$ fraction. Systems of this type are discussed in German Pat. No. 23 28 151. Trioctylamine has been found to be particularly suitable. The optimum amine concentration is between 20 and 30 volume percent.

A suitable diluent is kerosene, which is commonly used in solvent extraction, but other organic diluents are known, as is evident from the prior art identified earlier herein. A product containing a high percentage of aliphatic compounds, for example a product commercially available as "ESCAID 110", which begins to boil at 250° C., is well suited when used in an amount from 75 to 65 volume percent.

To avoid the formation of three phases, the known modifiers may be used. The extractant mixture will produce consistently good extraction results over a temperature range from 20° to 40° C. Higher temperatures are not required for reextraction, either.

In actual use, inhibitors and emulsifiers are added to the acid pickles. As a rule, these are organic substances which are capable of slowing the attack of the acid on the substrate metal while preferentially dissolving rust and scale. The function of the emulsifiers is to emulsify in the acid the oil and fat residues dissolved from the workpieces so that they will not float on the surface of the pickling bath and deposit as a film on the treated parts when these are removed from the bath.

It has been found that the presence of such inhibitors and emulsifiers has an adverse effect on unit operations where solid and/or liquid ion exchangers are present. The process of the invention, therefore, preferably includes a pretreatment of the spent acid with adsorbents, preferably activated carbon. The activity, adsorptive capacity, and deactivation of the activated carbon can be monitored by measuring the surface tension before and after treatment of the spent acid.

It is advisable to conduct the organic phase through a conventional mechanical separating aid downstream of the extraction section. The residues of aqueous phase which there are separated almost completely are recycled to the starting solution. To obtain a zinc chloride raffinate of as high a purity as possible so that it can be used in an electrolysis, for example, the organic phase is washed prior to reextraction. The wash water is best recirculated continuously. In order that reextraction of zinc chloride does not already set in at this point, the wash solution used in accordance with the invention is advantageously a dilute zinc chloride solution which is in equilibrium with organic phase. In this way, any residual iron still present in the organic phase is also removed. This iron is precipitated with basic zinc compounds, such as zinc oxide, as iron hydroxide in an agitated tank inserted in the water circuit, the zinc chloride solution being at the same time regenerated and recycled after filtration.

Reextraction yields zinc chloride solution of high purity which can be utilized conventionally. For example, it may be subjected to a zinc chloride electrolysis which will result in the deposition of metallic zinc with a purity of 99.99 percent, good ductility, and bright appearance along with a very smooth surface that is free of buds and pores.

Spent pickles usually have the following composition:

| 1. Free HCl | About 10 to 150 g/l |
|---|---|
| 2. Total iron | 50 to 150 g/l |
| 3. Zinc and other nonferrous metals | 0 to 150 g/l |

For the practice of the process of the invention, average values are established for the composition and used as consistently as possible. These are:

| 1. Free HCl | About | 50 g/l |
|---|---|---|
| 2. Divalent iron | About | 120 g/l |
| 3. Trivalent iron | About | 10 g/l |
| 4. Zinc | About | 60 g/l |

On leaving the liquid-liquid extraction section, the iron (II) chloride solution from which the zinc has been removed in accordance with the invention will contain residual zinc concentrations on the order of about 300 mg/l. After it has been oxidized to $Fe^{+3}$, it can therefore be used in a number of applications, for example, as an etching solution. However, if it is sought to obtain an iron (III) chloride solution suitable also for use as a conditioner in water conditioning, the residual zinc content should be reduced to less than 1 mg/l.

This can be done, for example, by having the three-stage liquid-liquid extraction followed by a resinous fixed-bed ion exchanger. The iron (II) chloride solution from which the zinc has thus been removed almost completely can then be oxidized to the +3 state by means of commonly used oxidizing agents, for example by the use of the mixture of air and chlorine gas evolved at the anode in zinc chloride electrolysis.

The course and advantages of the process of the invention will now be described in greater detail with reference to the unit processes and operations represented in the flow sheets of FIG. 1.

Spent hydrochloric acid carrying iron, zinc and other nonferrous metals is first run continuously through a fixed bed of activated carbon for removal of organic constituents such as inhibitors and emulsifiers. Inhibitors, for example, which would prove troublesome in the first cementation stage which follows, and emulsifiers, whose presence would adversely affect the course of the liquid-liquid extraction, thus are dependably retained. The solution, heated to 20° to 45° C., then enters the two stage cementation section. The first stage consists of column 12 filled with iron turnings and/or granules. Through contact of the spent acid with metallic iron in this column, the acidity of the hydrochloric acid is reduced to a working pH of 3 required in the second stage, which follows. At the same time, any $Fe^{+3}$ which may be present is reduced to $Fe^{+2}$.

In the first cementation stage, a few nonferrous metals are cemented in whole or in part in metallic form. The complete removal of the remaining toxic heavy metals is then effected in the second cementation stage. In agitated tank 13 of that stage, zinc dust is added batchwise to the solution. The heavy metal cementate formed is discharged from the agitated tank and the treated solution is stored in buffer tank 14 and from there continuously fed to a liquid-liquid extraction unit by way of filter 15. The entire plant section comprising plant components 14 to 18 is placed under an inert gas atmosphere to prevent the oxidation of $Fe^{+2}$ to $Fe^{+3}$. In multistage mixer-settler column 16, the zinc chloride is extracted from the iron-containing solution. This is done by means, for example, of an organic phase of tri-n-octylamine in a kerosene/isodecanol mixture. Since this mixture has a pronounced tendency to form emulsions, the organic phase exiting from the last settler of the extraction unit is conducted through phase separation apparatus 17. This apparatus is constructed in the manner of a settler with a separating cartridge made of plastic gauze which is located in the inlet section. The organic phase, which has thus been freed almost completely of aqueous phase, then undergoes a washing process in mixer-settler 18, is mixed with zinc oxide in agitated tank 19 for precipitation of the iron taken up and which, after passing through filter 20, is recycled to mixer-settler 18.

The further treatment of the zinc loaden organic phase is carried out by reextraction in mixer-settler 21. The organic phase from which the zinc has been removed is freed almost completely from aqueous phase in phase-separation apparatus 22 of the type described earlier and is then recycled to mixer-settlers 16 for further zinc extraction.

The aqueous zinc chloride raffinate is treated in the usual manner. If it is used to carry out a zinc chloride electrolysis, for example, it will permit the deposition of an electrolytic zinc with a purity of 99.9 percent. The chlorine gas evolved in this electrolysis can be used in packed column 24 as oxidizing agent for the iron (II) chloride obtained in mixer-settler 16.

The iron (II) chloride solution from which the major portion of the zinc has been removed in mixer-settler 16 is conducted through anion exchange column 23. The zinc content of the solution is thus reduced to values below 1 mg/l. In packed column 24, the iron (II) chloride solution is oxidized by the admission of gaseous oxidizing agents to iron (III) chloride solution which can be used as a flocculant, for example in water conditioning.

PRACTICAL EXAMPLE

A spent hydrochloric acid having the following composition, for example was used:

| | |
|---|---|
| Free HCl | 39.7 g/l |
| $Fe^{+2}$ | 107.4 g/l |
| $Fe^{+3}$ | 6.6 g/l |
| Zn | 47.9 g/l |
| Pb | 403.0 mg/l |
| Sn | 51.8 mg/l |
| Cd | 38.2 mg/l |

Surface tension: 0.062 N/m.

The treatment in the two-stage cementation unit resulted in the following values:

| | |
|---|---|
| Free HCl | 0.05 g/l |
| $Fe^{+2}$ | 144.3 g/l |
| $Fe^{+3}$ | Not detectable |
| Zn | 47.7 g/l |
| Pb | 3.2 mg/l |
| Sn | 2.0 mg/l |
| Cd | 1.3 mg/l |

Surface Tension: 0.083 N/m.

This solution was fed to a three stage extraction unit followed by a fixed bed anion exchanger, at the exit of which it had a residual zinc content of 0.6 mg/l. The zinc-laden organic phase was extracted with water. The raffinate containing zinc chloride so obtained contained 23.8 g/l zinc.

By the use of the process of the invention, there were recovered from 1,000 liters of spent acid:
47.5 kg zinc and
965.0 liters of 41.9% iron (III) chloride solution.

What is claimed is:

1. A process for the treatment of a spent hydrochloric acid solution containing dissolved iron and zinc, which process comprises contacting said solution with metallic iron in a first stage such that trivalent iron present in the solution is reduced to divalent iron and whereby a pH value of about 3 is established, next, in a second stage contacting said solution containing dissolved zinc and divalent iron with metallic zinc, and then extracting zinc, as zinc chloride, from the resulting aqueous phase with an organic liquid containing a complexing agent for zinc chloride.

2. A process as in claim 1 wherein said reduction of trivalent iron and said extraction are carried out under an inert gas.

3. A process as in claim 1, wherein said spent acid solutions are treated with adsorbents prior to said first stage.

4. A process as in claim 1, wherein, following extraction, the organic liquid is washed with a dilute zinc chloride solution.

5. A process as in claim 4 wherein said dilute zinc chloride wash solution is recirculated and is regenerated by adding zinc oxide thereto, whereby iron taken up into said wash solution is precipitated as iron hydroxide.

* * * * *